United States Patent Office 2,891,096
Patented June 16, 1959

2,891,096
HYDROGENATION OF PHENOLS

William H. Clingman, Jr., Texas City, Tex., assignor to The American Oil Company, Texas City, Tex., a corporation of Texas No Drawing. Application December 28, 1956
Serial No. 631,071

6 Claims. (Cl. 260—631)

This invention relates to the hydrogenation of phenolic compounds and particularly concerns an improved method for effecting nuclear hydrogenation phenolic compounds.

While previous investigators have found that a low temperatures and atmospheric pressures phenol can be hydrogenated to produce cyclohexanol, the reaction proceeded slowly. When the temperature of the reaction was increased to about 500° F. in order to increase the reaction rate, dehydroxylation occurred and benzene was the only product produced (Sabatier et al., "Catalysis in Organic Chemistry," Van Nostrand Co. 1922, page 135). Similarly the three cresols were converted to toluene according to Sabatier. Increasing the pressure has a similar effect in increasing the amount of dehydroxylation. As the molecular weight of the phenol is increased by the presence of long alkyl side chains, nuclear hydrogenation requires more drastic conditions of temperature and pressure. Dehydroxylation occurs to a greater extent and the yield of alkyl cyclohexanols is thereby lowered.

An object of this invention is to provide a method for effecting nuclear hydrogenation of phenolic compounds to produce the corresponding cyclohexanols. Another object is to provide an improved method for carrying out the nuclear hydrogenation of phenolic compounds which reduces the extent of dehydroxylation that normally occurs. A further object is to provide a process for the nuclear hydrogenation of phenolic compounds at a higher reaction rate to produce better yields of the corresponding cyclohexanols while minimizing the extent of dehydroxylation of the phenolic compounds which normally would occur. Other objects and advantages of the present invention will be apparent from the detailed description thereof.

In accordance with my invention phenolic compounds such as phenol, cresols, butylphenols, and other mono- and dialkylphenols (which suitably may have less than 12 carbon atoms per molecule) are hydrogenated in the presence of an organic amine under conditions to effect nuclear hydrogenation of the phenolic compound. The molar ratio of phenolic compound to oragnic amine may suitably be from 5:1 to 1:5. Organic amines including primary, secondary, and especially tertiary amines of aliphatic or cyclic type (preferably containing only one ring when of the cyclic type) are used. The nuclear hydrogenation conditions may comprise a temperature between about 300 and 700° F., pressures which may be as high as 2,000 p.s.i.g. or higher, and the use of a suitable hydrogenation catalyst. During the hydrogenation process the phenolic compounds are hydrogenated to their corresponding cyclohexanol compounds. However, a portion of the phenolic compounds reacts with the organic amine to form complex amine condensation products which have a higher molecular weight and are higher boiling than either of the initial reactants. If, for example, the organic amine used is pyridine or triethylamine then the amine condensation products have an average molecular weight of 300–400. While the presence of the amine in the hydrogenation reaction zone reduces the extent of dehydroxylation of the phenolic compound, the yields of the corresponding cyclohexanol compound are reduced over that attainable if no amine were present due to the reaction between the phenolic compound and the amine in forming the higher molecular weight amine condensation product. After hydrogenation has been effected, the reaction products are removed from the hydrogenation zone. Additional amounts of phenolic compound are then introduced into the hydrogenation zone and the amine condensation product is introduced into the hydrogenation zone. The hydrogenation process is then carried out as described supra to effect nuclear hydrogenation of added phenolic compounds. The amine condensation product which was introduced into the hydrogenation zone not only prevents dehydroxylation of the phenolic compound but it also increases the yield of the corresponding cyclohexanol compound, presumably because it does not react with the phenolic compound. The amine condensation products can be repeatedly recycled to the hydrogenation zone into which additional quantites of the phenolic compound are introduced.

In carrying out the first step of the process of this invention, i.e. the hydrogenation of a phenolic compound in the presence of an amine to form the cyclohexanol compound and the amine condensation product, various phenolic compounds can be used. The phenolic compounds which are used are reactive with the amine to form the amine condensation product which has a higher molecular weight and is higher boiling than either the phenolic compound or the amine initially employed. Thus phenolic compounds having less than 12 carbon atoms per molecule, e.g. 10 carbon atoms per molecule, can be employed very effectively in the process of my invention. Alkylphenols which have a greater number of atoms per molecule, for example those having 16–18 carbon atoms per molecule, do not appear to react with the amine to form the amine condensation products which are used in the practice of my invention. For example phenol, monoalkylphenols such as methylphenols, ethylphenols, propylphenols, butylphenols, dialkylphenols such as dimethylphenols, diethylphenols, and the like can be used. Commercially available phenolic compounds such as cresols, xylenols, etc. produced in the coking of coal or as byproducts from the refining of petroleum may be employed. The amine condensation products which are produced in the first step of the invention are to be understood however as not limited to those amine condensation products formed from the reaction of amines with the above listed phenolic compounds but includes within its scope amine condensation products formed by reaction of amines with any other reactive phenolic compound during the hydrogenation step such as dihydroxyphenols (catechols, resorcinol, hydroquinone), its low molecular alkylation products and substitution products, etc.

The organic amines used in the first hydrogenation step are employed in amounts sufficient to produce the amine condensation product. The molar ratio of phenolic compound to amine may suitably be within the range of about 5:1 to 1:5, although even higher or lower ratios of phenolic compound to amine can be used. The organic amines used have a molecular weight below 120–125, suitably below 100. They may be primary, secondary, or tertiary amines. They may be aliphatic, cycloaliphatic, aromatic or heterocyclic amines. Tertiary aliphatic amines such as trimethylamine, triethylamine, tripropylamines, etc. are very effective. Heterocyclic amines such as pyridine, methylpyridines, dimethylpyridines, etc. are also very effective. N-dialkylanilines are also excellent amines to use. While unsaturated heterocyclic amines such as pyridine are very effective in forming the amine condensation product, their corresponding saturated heterocyclic amines such as piperidine and alkylpiperidines may also be employed. When cyclic amines are used, they may suitably contain only one ring. Various primary and secondary amines such as ethylamine, diethylamine, propylamines, dipropylamines, butylamines, ethylenediamine, propylenediamine, cyclohexylamine, aniline and its low molecular weight ring alkylated products, N-methylanilines, toluidines, etc. may be employed.

In this first hydrogenation step, the phenolic compounds and the organic amines, such as have been discussed supra, are contacted with a hydrogenation catalyst in the presence of hydrogen and under conditions to effect nuclear hydrogenation of the phenolic compound. These conditions usually comprise a temperature of about 300 to 700° F. and a pressure of up to 2,000 p.s.i.g. or even higher. Weight hourly space velocities of from 0.1 to 10 or higher parts of phenolic compound/part of catalyst/hour are usually satisfactory. The usual hydrogenation catalysts such as nickel on kieselguhr or other supports, Raney nickel, platinum on alumina, nickel tungsten sulfide, copper chromite or any others which are effective for the nuclear hydrogenation of phenolic compounds can be used.

During the hydrogenation step, a portion of the phenolic compound is hydrogenated to its corresponding cyclohexanol compound and a portion is reacted with the amine to form the higher boiling complex amine condensation products which are used in the later step of my process. The amine condensation products cannot be completely identified. They may consist of a mixture of many different condensation products produced by different chemical mechanisms. Although I do not wish to be bound by any theory, it appears that the phenol alkylates the amine with water being split out during the reaction. If the amine used is a primary amine such as aniline, it is believed that N-alkylation occurs. Surprisingly, when the amine is a heterocyclic amine such as pyridine or a tertiary amine such as triethylamine, alklation by the phenol nevertheless occurs but the alkylating phenol molecule appears to attach itself to a carbon atom. The amine condensation product may be the result of reaction between one mol of the organic amine and either one or two mols of the phenolic compound. Even higher molecular weight polymers may be produced. The molecular weight of the amine condensation product depends to some extent of course on the organic amine initially used. However it usually has an average molecular weight of at least 150 and often is 200 to 400 or higher. For example when the organic amine used is pyridine or triethylamine, the average molecular weight of the amine condensation products is approximately 320 and 350 respectively.

After carrying out the first hydrogenation step, the reaction products are then removed from the hydrogenation zone. Thereafter additional quantities of phenolic compounds which are to be hydrogenated are introduced into the hydrogenation zone. Amine condensation products from the first hydrogenation step are introduced into the hydrogenation zone. Thereafter the phenolic compounds are hydrogenated in the presence of the introduced amine condensation product. The amine condensation product may suitably be introduced into the hydrogenation zone in an amount between about 5 and 50 percent by weight based upon the amount of phenolic compound which is to be hydrogenated. About 20 percent by weight of the amine condensation product based upon the weight of the phenolic compound to be hydrogenated is ordinarily quite satisfactory. Conventional conditions used to effect nuclear hydrogenation of the phenolic compounds, such as the conditions which were discussed previously are employed. The amine condensation product introduced into this second and subsequent hydrogenation steps may comprise a portion of the total reaction products from the first hydrogenation step or the amine condensation product may be physically separated from the total reaction products of the first hydrogenation step and the physically separated amine condensation product introduced into the hydrogenation zone in which the second hydrogenation step is being carried out. Convenient methods for separating the amine condensation product from the first hydrogenation step are (1) distillation to remove overhead any unconverted phenolic compound or organic amine as well as cyclohexanol compounds and then removing the amine condensation products as a liquid bottoms, (2) extracting the amine condensation product by forming acid salts thereof, e.g. the acetic acid or hydrogen chloride salt, and then regenerating the amine condensation product by treating the salt solution with a base such as caustic or the like. The simplest and preferred method consists of separating a portion of the total hydrogenation products (which will contain the amine condensation product) from the first step and introducing this portion into the second hydrogensation step. The hydrogenation step may be practiced as a continuous operation in which phenolic compound, amine condensation product and hydrogen are continuously introduced into the hydrogenation zone, the reaction products continuously removed and the lower boiling cyclohexanol compounds, etc. fractionated therefrom, the remaining amine condensation products then being recycled to the hydrogenation zone into which additional quantities of the phenolic compound to be hydrogenated are introduced.

In the practice of my invention, the amine condensation product can be used in the nuclear hydrogenation of the same phenol as was employed in producing the amine condensation product, or it can be used in the nuclear hydrogenation of phenols other than the ones used in preparing the amine condensation product. Thus the amine condensation product can be prepared in the first step by the nuclear hydrogenation of an equimolar mixture of phenol and pyridine and the amine condensation product can be recovered and used in the amount of about 10–25 weight percent in the nuclear hydrogenation of xylenols, tertiary butylphenol, etc.

Experiments were carried out which illustrate the practice and advantages to be gained by the use of the present invention. All of the hydrogenation experiments were carried out in a similar manner. The phenolic compound (which was p-tertiary butylphenol), organic amine or amine condensation product, and n-heptane diluent were charged to a stainless steel high pressure bomb. A commercial nickel on kieselguhr catalyst (Ni 0104 T ⅛ form Harshaw Chemical Company) in an amount approximately equal to the amount of phenol charged was activated with hydrogen and introduced along with the phenol, heptane, and amine into the bomb. Hydrogen was pressured into the reactor up to 1,000 p.s.i.g. The reactants were heated and agitated for about 5 hours after the reaction temperature of 400° F. had been reached. Hydrogen was added intermittently to maintain the pressure between 1,000 and 1,700 p.s.i.g. After about 2 hours, there was no further decrease in pressure (indicating that hydrogenation had been virtually completed), but the reactants were kept at the reaction temperature for about 3 hours further to ensure absolutely complete hydrogenation. After cooling, the reactants were rinsed from the bomb with n-heptane, the catalyst filtered from the solution, and the amount of the cyclohexanol compound determined. In all of the runs reported, the reaction products contained less than 0.1 percent of the original phenolic compound, indicating essentially complete conversion of the phenolic compound during the hydrogenation step. Experimental results are shown in Table I which follows:

*Table I*

| Run No. | Amount of p-Tertiary butyl-phenol, g. | Amine Compound | p-Tertiary butylcyclo-hexanol Yield, Mol Percent Based on Phenol |
|---|---|---|---|
| 1 | 159 | None | 36 |
| 2 | 160 | 80 g. Pyridine | 18 |
| 3 | 81 | ca. 80 g. amine condensation product.[1] | 68 |
| 4 | 80 | ca. 20 g. amine condensation product.[2] | 66 |
| 5 | 80 | ca. 40 g. amine condensation product.[3] | 68 |

[1] A portion (40%) of the total liquid reaction products from run 2 was used. This portion contained approximately the stated amount of amine condensation product, the acetamide derivative of which had a molecular weight of 391 and contained 3.89 percent nitrogen.
[2] Same as ([1]) but the portion of the total products from run 2 was 10%
[3] A portion (70%) of the total liquid reaction products from a hydrogenation experiment using 80 g. p-tertiary butylphenol + 16 g. triethylamine was used. This portion contained approximately the stated amount of amine condensation product, the acetamide derivative of which had a molecular weight of 361 and contained 3.67 percent nitrogen.

From the results shown in Table I it is apparent that when pyridine is employed in the hydrogenation zone, the yield of the p-tertiary butylcyclohexanol is decreased over that obtained when no amine is present during hydrogenation. Contrary to the results obtained with pyridine, the data show that when an amine condensation product, from the hydrogenation run in which pyridine or triethylamine were present, is introduced into the hydrogenation zone the yield of tertiary butylcyclohexanol is increased by almost 100 percent.

Another series of experiments was carried out in the same manner as previously described, except that the hydrogenation temperature was approximately 350–380° F. In this series, various phenolic compounds were hydrogenated. Runs were made in the absence and presence of an amine condensation product which had been produced during the hydrogenation of an equimolar mixture of pyridine and p-tertiary butylphenol. The amine condensation product used in run 11 was produced in the hydrogenation of an equimolar mixture of commercial cresylic acids and pyridine. The results obtained in this series of experiments are shown in Table II which follows:

*Table II*

| Run No. | Phenol Compound | Amine Condensation Compound, g. | Cyclohexanol Compound Yield, Mol Percent Based on Phenol |
|---|---|---|---|
| 6 | 186 g. Phenol | None | 67 |
| 7 | 93 g. Phenol | 17 | 80 |
| 8 | 54 g. p-Cresol | None | 58 |
| 9 | 55 g. p-Cresol | 17 | 86 |
| 10 | 51 g. Cresylic Acids [1] | None | 54 |
| 11 | 50 g. Cresylic Acids [1] | ca. 40 | 75 |

[1] Commercial cresylic acid mixture, chiefly xylenols and having a sulfur content of .04%.

It may be noted from the above results that by introducing the amine condensation product into the hydrogenation zone, the yield of the corresponding cyclohexanol compound from its phenol is substantially increased.

Thus having described the invention what I claim is:
1. In a process for converting phenol compounds to cyclohexanol compounds wherein a phenol compound selected from the group consisting of phenol, alkylated phenols having less than 12 carbon atoms per molecule, and mixtures thereof is introduced in a reaction zone and therein contacted with hydrogen and a hydrogenation catalyst under conditions effecting hydrogenation of the phenol compound to the corresponding cyclohexanol compound, said conditions comprising a temperature between about 300° and 700° F. and hydrogen partial pressures up to about 2000 p.s.i.g., and in which reaction zone a portion of the phenol and cyclohexanol compounds are dehydroxylated to form hydrocarbons, the improvement whereby dehydroxylation is reduced which improvement comprises introducing into the reaction zone an organic amine having a molecular weight of less than 125, removing reaction products from the reaction zone, separating cyclohexanol compounds from the reaction products, separating from the reaction products a portion thereof containing amine condensation products which have been formed in the reaction zone and introducing this latter portion in the reaction zone, discontinuing the introduction into the reaction zone of the organic amine having a molecular weight of less than 125 while repeating the introduction of the phenol compound and the amine condensation product into the reaction zone.

2. The process of claim 1 in which phenol is converted to cyclohexanol.

3. The process of claim 1 in which tertiary butyl phenol is converted to tertiary butyl cyclohexanol.

4. The process of claim 1 in which the organic amine initially introduced to form the amine condensation product is pyridine.

5. The process of claim 1 in which the organic amine initially introduced to form the amine condensation product is triethyl amine.

6. The process of claim 1 in which the reaction products after removal from the reaction zone are subjected to distillation and cyclohexanol compounds are recovered overhead while amine condensation products are removed as a bottoms fraction and then recycled to the reaction zone.

References Cited in the file of this patent
UNITED STATES PATENTS

| 2,087,691 | Lazier | July 20, 1937 |
| 2,100,468 | Howk et al. | Nov. 30, 1937 |
| 2,328,719 | Houghton et al. | Sept. 7, 1943 |
| 2,376,286 | Smith et al. | May 15, 1945 |
| 2,387,617 | Schmidt et al. | Oct. 23, 1945 |
| 2,433,008 | Whitaker et al. | Dec. 23, 1947 |
| 2,574,077 | Whitaker et al. | Nov. 6, 1951 |
| 2,794,056 | Winstrom | May 28, 1957 |

FOREIGN PATENTS

| 669,824 | France | Feb. 18, 1929 |
| 306,414 | Great Britain | May 19, 1930 |
| 725,083 | Germany | Sept. 15, 1942 |
| 809,551 | Germany | July 30, 1951 |
| 872,342 | Germany | Mar. 30, 1952 |

OTHER REFERENCES

Sabatier: "Catalysis in Organic Chemistry," translated by E. E. Reid, D. Van Nostrand Co., N.Y., 1922; pages 135, 166 and 167.

Clark: B.I.O.S. Final Report No. 743, item No. 22 (PB47, 719); September 1946; pages 1–5.

Goering et al.: J.A.C.S., vol. 78, No. 19, Oct. 5, 1956; page 4929.

UNITED STATES PATENT OFFICE
CERTIFICATE OF CORRECTION

Patent No. 2,891,096                                           June 16, 1959

William H. Clingman, Jr.

It is hereby certified that error appears in the printed specification of the above numbered patent requiring correction and that the said Letters Patent should read as corrected below.

Column 1, line 17, after "hydrogenation" insert the word "of"; line 19, for "a low" read -- at low --; column 4, line 29, for "hydrogensation" read -- hydrogenation --; line 59, for "form" read -- from --.

Signed and sealed this 3rd day of November 1959.

(SEAL)
Attest:

KARL H. AXLINE                                                          ROBERT C. WATSON
Attesting Officer                                                   Commissioner of Patents